United States Patent [19]
Thomas

[11] Patent Number: 6,026,058
[45] Date of Patent: Feb. 15, 2000

[54] METHOD FOR SORTING SEISMIC DATA

[75] Inventor: James W. Thomas, Bartlesville, Okla.

[73] Assignee: Phillips Petroleum Company, Bartlesville, Okla.

[21] Appl. No.: 08/874,915

[22] Filed: Jun. 13, 1997

[51] Int. Cl.⁷ .................................................. G01V 1/20
[52] U.S. Cl. ............................. 367/56; 367/40; 181/108
[58] Field of Search ................................ 367/51, 58, 56, 367/52, 40; 181/108

[56] References Cited

U.S. PATENT DOCUMENTS

| | | | |
|---|---|---|---|
| 3,529,282 | 9/1970 | Brown et al. | 340/15.5 |
| 3,793,620 | 2/1974 | Miller | 340/15.5 |
| 4,001,770 | 1/1977 | Hofer | 340/15.5 |
| 4,403,312 | 9/1983 | Thomason | 367/56 |
| 4,677,598 | 6/1987 | Johnson | 367/56 |
| 5,257,241 | 10/1993 | Henderson et al. | 367/15 |
| 5,487,052 | 1/1996 | Cordsen | 367/56 |
| 5,511,039 | 4/1996 | Flentge | 367/56 |
| 5,598,378 | 1/1997 | Flentge | 367/56 |

OTHER PUBLICATIONS

Vermer, "Discussion", Geophysics, vol. 60, No. 3, Mar. 1, 1995, pp. 921–923.
Walton, "Three Dimensions Seismic Method" Geophysics, vol. 37, No. 3, Jun. 1, 1972.
Schleicher et al, "3–D True Amplitude Finite–Offset Migration", Geophysics, vol. 58, No. 8, Aug. 1, 1993.

*Primary Examiner*—Christine K. Oda
*Assistant Examiner*—Anthony Jolly
*Attorney, Agent, or Firm*—George E. Bogatie

[57] ABSTRACT

An improved method for gathering traces in a 3-D seismic survey is disclosed. In one configuration, receiver lines having equally spaced geophone receivers stations are run in one direction, and lines of equally spaced shotpoint stations run orthogonal to the receiver station lines. The station spacing in each shotpoint and receiver lines is selected to produce a desired spatial resolution, and the individual lines are spaced apart by a distance equal to at least two times the station intervals. In this method, a series of common mid point gathers centered about source/receiver line intersection, referred to as "hybrid gathers" is made, where each hybrid gather includes traces from a designated number of shots in the shotpoint line of the selected intersection that are directed into a designated number of geophone receivers in the receiver line of the selected intersection. Full survey data from the crossed-arrayed shotpoint/receiver geometry can be assembled from the series of hybrid gathers, however, an advantage of the hybrid gather is that each hybrid gather can be individually processed and imaged using techniques that depend upon adequate spatial sampling, such as velocity filtering, which techniques are normally reserved for full common midpoint summed gathers. Other shotpoint/receiver layout configurations used with hybrid gathers are also disclosed.

8 Claims, 9 Drawing Sheets

METHOD FOR SORTING SEISMIC DATA

This invention relates to seismic prospecting, and more particularly to obtaining a three-dimensional single-fold hybrid gather having spatial resolution characteristics of true three-dimensional gathers.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on the terrain, or some other energy source having capacity for delivering a series of impacts or mechanical vibrations to the earth's surface. The acoustic waves generated in the earth by these sources are partially reflected from various earth layers and transmitted back from layer boundaries and reach the surface of the earth at varying intervals of time, depending on the distance and characteristics of the subsurface traversed. These returning waves are detected by the geophones, which function to transduce such acoustic waves into representative electrical signals. In use an arrangement of geophones is generally laid out along a line to form a series of observation stations within a desired locality. The source injects an acoustic signal into the earth, and the detected signals, which are reflected from points midway between the source and receiver are recorded for later processing. These recorded signals, which are continuous electrical analog signals depicting amplitude versus time, are generally quantized using digital computers so that each data sample point may be operated on individually. The geophone arrangement is then moved along the line to a new position where some of the shot or receiver points may overlap, and the process repeated to provide a seismic survey. If the ground and subsurface reflecting layer are flat, as previously mentioned a seismic shot yields data from midway between the source and receiver. One of the techniques utilized in processing seismic data is to combine traces produced from two or more shots wherein the midpoint between the source and the receiver in each case is the same, although the offset, i.e., sources to receiver distance, may be different. When two or more traces belonging to a common midpoint (CMP) are summed, the technique is called common-midpoint stacking.

A single wave-producing activation of a source, called a shot, results in generating a number of traces equal to the number of receivers. Aligning all of the recorded traces from a single shot in a side by side display i.e. shot gather can produce a rudimentary two dimensional seismic section. The section can be improved, however, by the CMP stacking. Since sound traveling two different paths gives information from approximately the same subsurface point, two such traces reflected from a common point can be combined, i.e., summed, such that reflection amplitudes are added but the noise, which occurs at different times on the two traces, is not added thus improving the signal-to-noise ratio. The number of traces summed in an individual stack is called the multifold or simply the fold.

Figure 1:
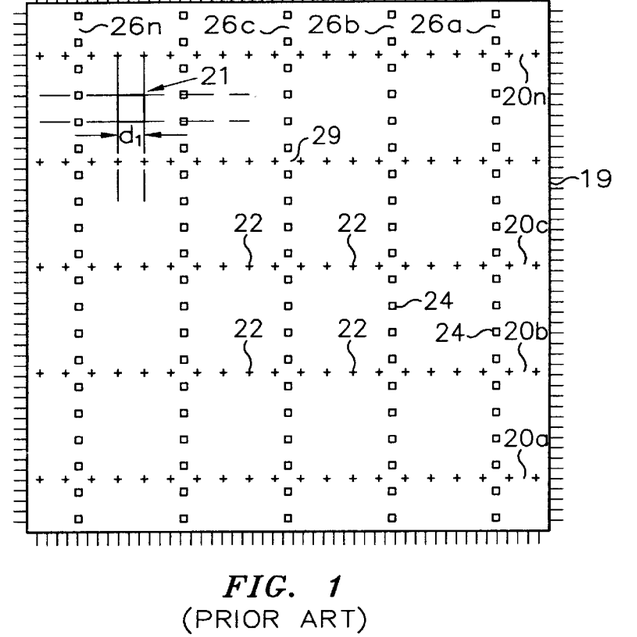
FIG. 1 shows a typical prior art seismic source/receiver layout geometry.

More recently, seismic surveys involve geophones and sources laid out in more complex geometries, generally involving rectangular grids covering an area of interest so as to expand areal coverage and enable construction of three-dimensional (3-D) views of reflector positions over wide areas. A normal prior art three-dimensional survey geometry is shown in FIG. 1, in which a basic grid, indicated generally at 21, is defined for effective placement of shotpoints that are designated as squares 24, and geophone receivers that are designated as crosses 22. As illustrated, the basic grid 21 is a square having a dimension $d_1$ that is equal to twice the desired reflection midpoint spacing, and that will provide an image having a desired resolution of subsurface features. A plurality of geophone receiver lines $20_a-20_n$ each containing a plurality of equally spaced apart geophone receivers 22 is place in parallel on the earth's surface. A plurality of shotpoints 24 is placed along source or shot lines $26_a-26_n$ which run orthogonally to the receiver lines $20_a-20_n$, thus providing a symmetrical crossed array geometry with geophone receivers 22 in lines $20_a-20_n$ and source stations 24 in lines $26_a-26_n$ spaced apart a distance equal to $d_1$, and the lines $26_{a-n}$ and $26_{a-n}$ spaced apart a distance of four times $d_1$. This crossed-arrayed geometry produces subsurface spatial resolution in which midpoints are spaced apart by one-half of the distance $d_1$ in the receiver line, and one-half of the distance $d_1$ in the source line. For example, if receivers and sources, as shown in FIG. 1, are each spaced 165 ft. apart, reflection midpoints will be spaced apart by 82.5 ft. and four adjacent midpoints will form a square.

Figure 2A:
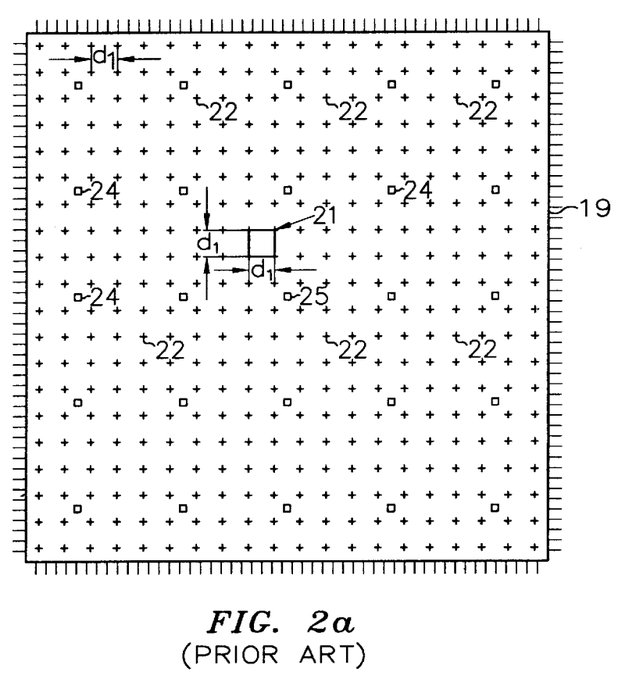
FIG. 2(a) shows a prior art true 3-D source/receiver layout geometry.
Figure 2B:
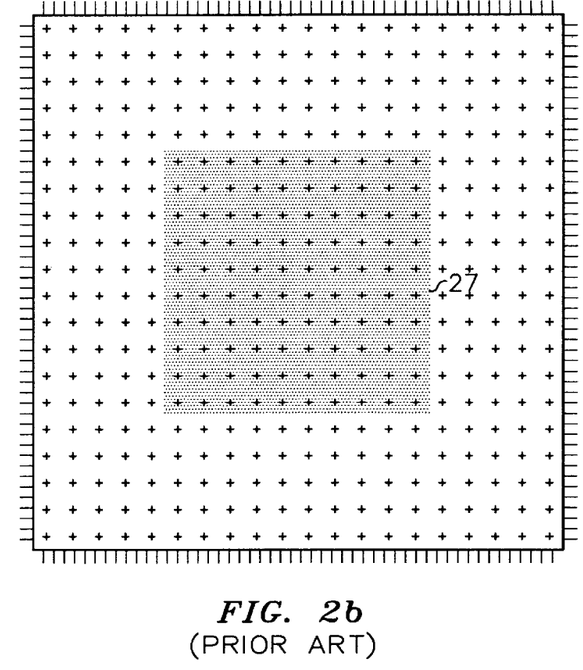
FIG. 2(b) shows single-fold midpoint coverage from activation of a single source of FIG. 2(a).

It is well known, however, to those skilled in the art that improved surface sampling resolution in a survey can be obtained with a source/receiver geometry that is referred to herein as "true 3-D coverage." This geometry also uses CMP stacking in which the shotpoints and receivers are laid out in the generally rectangular areas similar to the arrangement shown in FIG. 1, but with closer spacing of the receiver lines 20 in the shotpoint line direction. As used herein, a true 3-D seismic source/receiver geometry locates a geophone receiver and/or a shotpoint at each intersection of the basic grid 21. An example of true 3-D seismic source/receiver geometry having a geophone receiver at each intersection of the basic grid 21, and having shotpoints spaced apart at a distance four times $d_1$ is illustrated in FIG. 2. Using the same size basic grid 21 as shown in FIG. 1, such a true 3-D layout would include 400 geophone receivers and 25 shotpoints covering a surface area 19 in FIG. 2(a) that is equal to the surface area 19 shown in FIG. 1. Once all of the receivers and shotpoints are in place, the shots are sequentially activated and a number of traces that is equal to the number of shots times the number of receivers are recorded to provide a single data set from which a display of a seismic 2-D section, or a 3-D volume could be produced. In this true 3-D technique the recorded traces having common midoints, which are sorted out later from the recorded traces, are gathered in a display which yield greatly increased surface resolution compared to the surface resolution shown in FIG. 1.

In seismic acquisition and processing operations, it is well known to those skilled in the art that a frequency ambiguity called aliasing is inherent in sampling systems, and that aliasing occurs in a sampling process when there are fewer than two samples per cycle. Aliasing applies to both the time and space domains. The aliasing that is done by the separated elements of geophone receivers and shotpoints is called spatial aliasing and depends on the surface spacing of the shotpoints and receiver. The aliasing that is done by sampling an input signal is called frequency aliasing and is dependent on the sampling interval used to digitize input signals. To avoid aliasing filtering is commonly required. For example, an alias filter applied before sampling a geophone signal at a ground location removes certain undesired frequencies, likewise a velocity filter of a seismic gather attenuates certain coherent arrivals of waves, which sweep over the geophone receivers having certain apparent receiver velocities. Accordingly, an advantage of true 3-D seismic source/receiver layout geometry is avoiding spatial aliasing.

There is a disadvantage to this kind of true 3-D shooting, however, in the excessive amount of equipment required to occupy every surface location with a receiver and/or a source on a grid interval equal to twice the desired subsurface resolution. Today, however, a normal 3-D seismic survey based on a layout geometry similar to FIG. 1 is an accepted part of the early data-acquisition process because the high resolution display of 3-D surveys leads to an optimized appraisal of sites, refined reserve estimates, and more efficient development plans. Accordingly, the benefits of a 3-D survey using source receiver geometry similar to that shown in FIG. 1, although having certain known deficiencies, usually outweigh the additional cost compared to a 2-D survey.

Accordingly, if use of 3D seismic surveys is to continue to grow, a need exists for new and improved methods that simplify and/or provide economical alternatives that reduce the operational cost of obtaining a 3-D seismic survey.

It is an object of the present invention to provide flexibility in use of given equipment for field operations that obtain 3-D seismic survey data.

It is a more specific object of the invention to gather partial data from a section of a survey area having source line and receiver line resolution that facilitates unaliased 3-D digital filtering.

Another more specific object is to provide an early look at subsurface features from partial prestacked reconnaissance data having characteristics similar to 3-D processed data, so as to guide further planning of a seismic survey program, and/or processing of the seismic data.

SUMMARY OF THE INVENTION

According to the present invention, the foregoing and other objects and advantages are attained in a seismic data gathering method. In this method full survey data from a crossed-array source/receiver layout geometry is assembled from a series of hybrid gathers that are centered at the intersections of the crossed-array source/receiver lines. As used herein, a hybrid gather is a side-by-side grid display of seismic traces corresponding to a gather center located within in a larger 3-D crossed-array seismic grid layout and includes traces selected from sectional parts of the larger layout. Accordingly the hybrid gather is a singlefold CMP gather center about a source/receiver line intersection which has a desired spatial resolution in both shot line and receiver line directions. Steps in obtaining the hybrid gather include laying out the larger normal 3-D crossed array source/receiver survey area, with a selected dimension d applied to the spacing between both the source lines and receiver lines and a smaller dimension $d_1$ applied between sources and receivers in the respective source or receiver line. The dimensions d and $d_1$ thus define the number of sources in a selected source line, and the number of receivers in a selected receiver line to be included in the hybrid gather corresponding to each hybrid gather center. Next, a normal recording is made where a seismic source is energized at each shotpoint in the 3-D survey to induce seismic pulses into the earth, and the reflected seismic pulses generated by each of the geophone receivers are recorded for later processing. A series of hybrid gathers is then obtained by performing hybrid gathers at each intersection of the crossed array of source and receiver lines of the larger 3-D survey area, such that when the series of hybrid gathers is complete traces from the entire survey area can be gathered by assembling the series of hybrid gathers. Thus the spatial resolution associated with the fully assembled gather is equal to the spatial resolution of a true source/receiver layout.

In a preferred embodiment, a normal grid (e.g. FIG. 1) of source/receiver lines is laid out over a rectangular area to be surveyed, and a first hybrid gather for the rectangular area is centered at the intersection of the single source line and the single receiver line at the middle of the rectangular survey area, and includes traces from each of the sources in the single source line directed into all of the receivers in the single crossed-array receiver line. Accordingly, this hybrid gather provides rectangular single fold coverage from midpoints located in the central one-fourth of the survey area. This process is repeated for each intersection of source and receiver lines, to provide a full series of hybrid gathers equal to the number of intersections. Individual traces from the series of hybrid gathers can later be assembled into one gather of traces, and traces that have common midpoints can be summed to provide images very similar to a true 3-D gather. An important feature of this invention, however, is that each hybrid gather can be individually processed and imaged using techniques that depend upon adequate spatial sampling and are therefore normally reserved for full 3-D common mid-point summed gathers. Such techniques might include filtering, such as velocity and temporal filtering, dip move out (DMO), and migration of the individual hybrid gathers.

Other objects, advantages and novel features of the present invention will be apparent to those skilled in the art from the following description of the preferred embodiment, the appended claims and the drawings in which:

DETAILED DESCRIPTION OF THE INVENTION

The method of the invention will now be described in detail in terms of a simple embodiment employing a normal orthogonal crossed-arrayed source/receiver layout as illustrated in FIG. 1, which could be used for full 3-D imaging of the rectangular area. It should be understood, however, that the method of this invention could employ other source/receiver layouts that are known in the art such as angled or brick layouts, as well as marine layouts such as bottom cables, or vertical cables. Accordingly, the orthogonal geometry is used herein to aid the reader in understanding the present invention and not as a limitation to the present invention.

In making 3-D seismic surveys, data gathering equipment limitations and other economic considerations frequently dictate the number of receivers on each line and the spacing between receivers in the line that can be used to perform a survey. Accordingly, a normal crossed-arrayed geometry having line spacing referred herein to as d, such as between lines $20_a$ and $20_b$ in FIG. 1, equal to four or more times the basic grid spacing of $d_1$ is commonly employed.

In the following discussion with reference to FIGS. 1, 2, and 3, the area represented by the outer boundary 19 is the same for all three figures. Also like elements such as geophone receivers and shotpoints positioned in the boundary 19, are marked with the same reference numerals in these three figures.

Referring specifically now to FIG. 2(a), there is illustrated a true source/receiver layout geometry that assumes unlimited geophone receivers 22 and recorder channels (not illustrated) are available for making a survey. This geometry is a true 3-D source/receiver geometry having geophone receiver stations 22 spaced at grid intervals illustrated as $d_1$ equal to twice the desired midpoint resolution throughout the area 19. With this geometry a trace gather resulting from activation of a single shotpoint 25, such as a seismic vibrator or an explosive device, in the center of the rectangular area results in single fold midpoint data covering an internal area equal to one-fourth of the total area, which is shown in the crosshatched area 27 of FIG. 2(b). Comparative results for a hybrid gather are shown in FIG. 3, where the hybrid gather uses the intersection of source station line $26_c$ and geophone receiver line $2_c$ as a sort center 29. With this normal source/receiver arrangement each source as described above is activated in the source line $26_c$ to generate seismic waves or pulses into the earth which are detected by each of the geophone receivers shown in FIG. 1, however, the hybrid gather includes only the signals generated by receiver line $20_c$ responsive to shots in line $26_c$ and provides single-fold data corresponding to the midpoint between the activated source and receivers. The thus recorded data forms rows of midpoints, with the number of midpoints in a row equal to the number of receivers in the receiver line $20_c$ and the row of midpoints is one-half as long as line $20_c$. After the data has been recorded corresponding to activation of the first source station in line $26_c$, the next source station in that line is activated and data corresponding to a second row of midpoints is obtained. The second row of midpoints is displaced from the first row of midpoints by one-half the dimension of the basic grid 21, and like the first row of midpoints, the second row is one-half as long as the receiver line $20_c$. Continuing this process of sequentially activating shot locations in line $26_c$, and recording signals generated in the geophone receivers 22 located in line $20_c$ results in an identical single fold coverage for the same area obtained with true 3-D source/receiver layout illustrated in FIG. 2(b). By way of further comparison of the true gather shown in FIG. 2(b) and the hybrid gather shown in FIG. 3, it is noted that when all of the source stations along line $26_c$ have been activated and signals generated in receiver line $20_c$ recorded, the total number of traces in the hybrid gather is twenty shots times twenty geophone receivers, equal to 400 total traces, which is the same number of traces generated in the true 3-D gather shown in FIG. 2(b). Also the maximum offset for each gather illustrated in FIG. 2(b) and FIG. 3, is the same.

Figure 3:
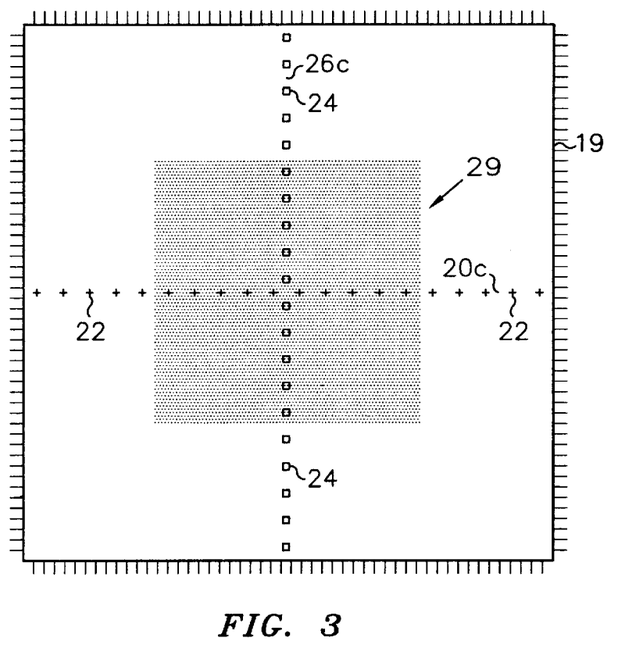
FIG. 3 shows single-fold midpoint coverage from activation of a line of sources directed into an orthogonal line of receivers, having spacing according to spacing shown in FIG. 1.

Accordingly, a first step in this invention is arranging a normal seismic source/receiver layout geometry similar to FIG. 1, wherein the shotpoints and geophone receivers are laid out with reference to a basic grid 21, and the orthogonal shot/receiver lines such as $20_a$ and $20_b$ and 26a and $26_b$ are spaced apart by some multiple of the basic grid dimension $d_1$, so as to provide a hybrid gather having single fold coverage such as shown in FIG. 3. Preferably the multiple of $d_1$ selected to determine the distance d is in a range of from two to ten times the dimension $d_1$, and more preferably it is in a range of from four to eight times the dimension $d_1$. Accordingly, the dimension $d_1$ illustrated in FIG. 1 is selected to include twenty shotpoints along line $26_c$ and twenty geophone receivers along line $20_c$ and the dimension d is selected to be four times $d_1$, and accordingly five shotlines and five receiver lines cover the area 19. Preferably the hybrid gather is selected to include at least all of the shotpoints in the source line or all of the geophone receivers in the receiver line corresponding to a gather center at a centrally located intersection of source and receiver lines. The thus selected shotpoints in line $26_c$ are sequentially activated with each activation generating a number of traces equal to the number of geophone receivers in line $20_c$. In this instance the number of traces for a hybrid gather is twenty source stations times twenty geophone receivers or 400 traces.

The hybrid gather sort center is then moved to another intersection, and the hybrid gathering process described above is repeated until a gather is obtained at each intersection of the source/receiver lines. The gathers are made with the requirement that each of the hybrid gathers maintains the same maximum in line and cross line offset. With reference to a sort center at the intersection of lines $20_c$ and $26_c$ in FIG. 1 the maximum offset is ten stations. For example, a hybrid gather centered at the intersection of geophone receiver line $20_a$ and source station line $26_a$, which is near the edge of the survey area, would include traces from ten sources in line $26_a$ that are above the intersection and two sources below the intersection directed into ten geophone receivers in line $20_a$ that are positioned to the left of the intersection and two receivers to the right of the intersection. This particular gather results in a total of 144 traces, i.e., twelve source stations whose activation energy is directed into twelve geophone receivers, which have a maximum offset of ten stations in both in line and cross line directions. Accumulation of hybrid sorts based on the source/receiver layout geometry in FIG. 1 results in 25 hybrid gathers having a maximum offset of ten times $d_1$ in both the source and receiver line directions.

Accordingly, each individual hybrid sort obtained as described above provides a spatially unaliased data set suitable for well known prestack processing operations, including antialiasing frequency filtering, amplitude equalization, normal moveout corrections, and, if necessary dip moveout (DMO) can be applied prior to applying a velocity filter for the gather. Each of these processing operations is well known in the art and is described at length in a text entitled "Applied Geophysics", W. M. Kelpford, et al, Cambridge University Press, 1978, which is incorporated herein by reference.

Figure 4:
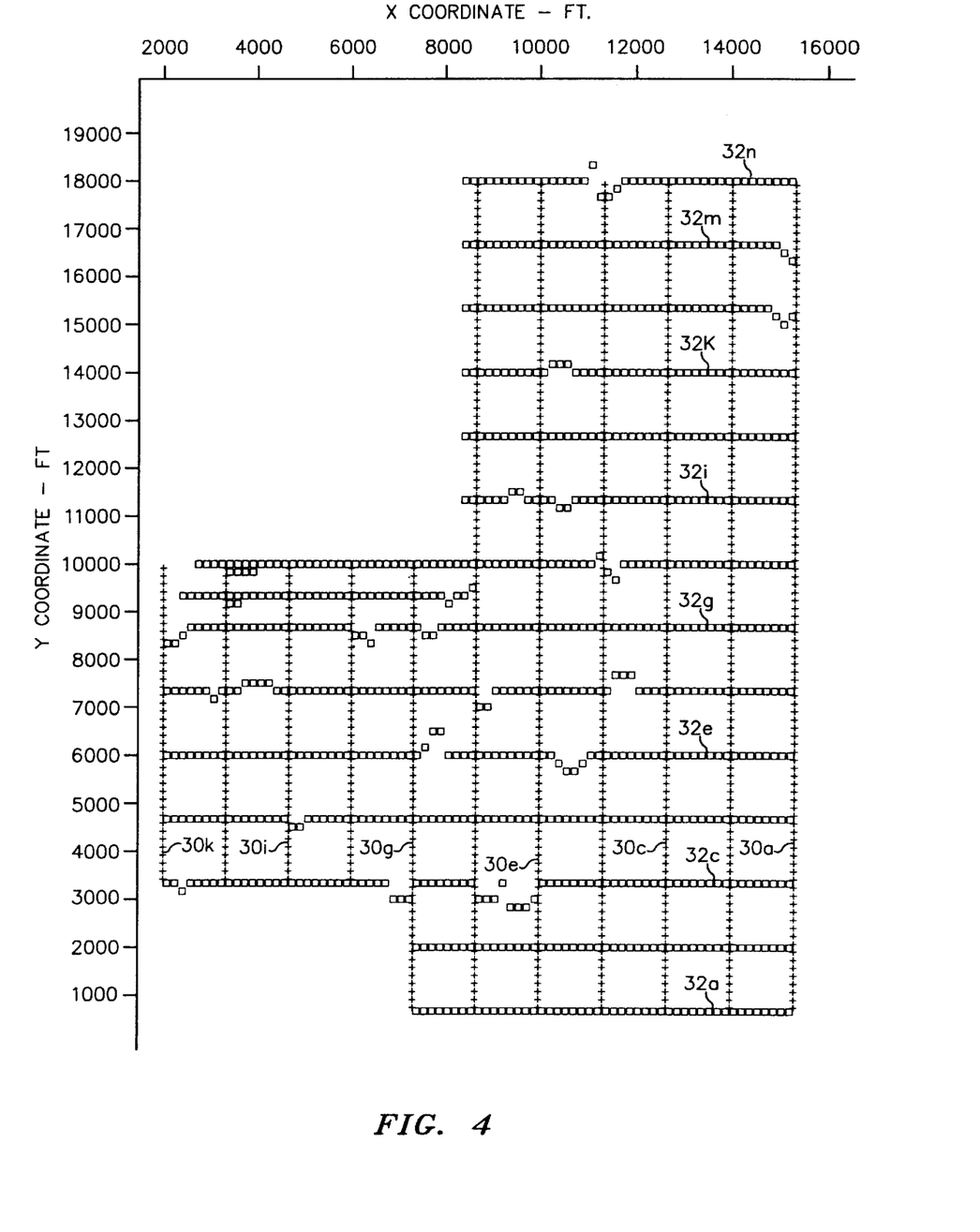
FIG. 4 shows a source/receiver layout for a 5.75 square mile basin area.

In a particularly successful test of this hybrid gather method of seismic exploration carried out in the Valverde Basin in Texas, a 5.75 square mile 3-D data set was recorded. The shot/receiver arrangement used in the test is shown in FIG. 4, as having geophone receiver lines $30_a$ through $30_k$ running approximately north/south with geophone group intervals of 165 ft., and orthogonally arranged shot station lines $32_a$ through $32_n$ running approximately east/west. A twelve-geophone receiver array was deployed at each group interval with the twelve geophones connected together and the thus summed signals were recorded in a recording truck. It is noted that these shot/receiver lines are generally laid out in an orthogonal arrangement, however, a few minor offsets of shots and receiver in these lines were necessitated by the adverse terrain features at certain locations. Vibroseis sources were employed at the source stations using sweep signals varying from six to sixty hertz over a fifteen second period, and having spectral bandwidth shaping of a negative six db per octave. The data was recorded as a static survey with 868 shots monitored by 840 geophone receivers. The orthogonal nature of the source/receiver layout with 165 ft. source and receiver spacing in the lines 30 and 32, and 1320 ft. spacing between lines, produced a survey suitable for conventional 3-D processing and imaging techniques, with adequate spatial sampling in both the in line and cross line directions.

Figure 5:
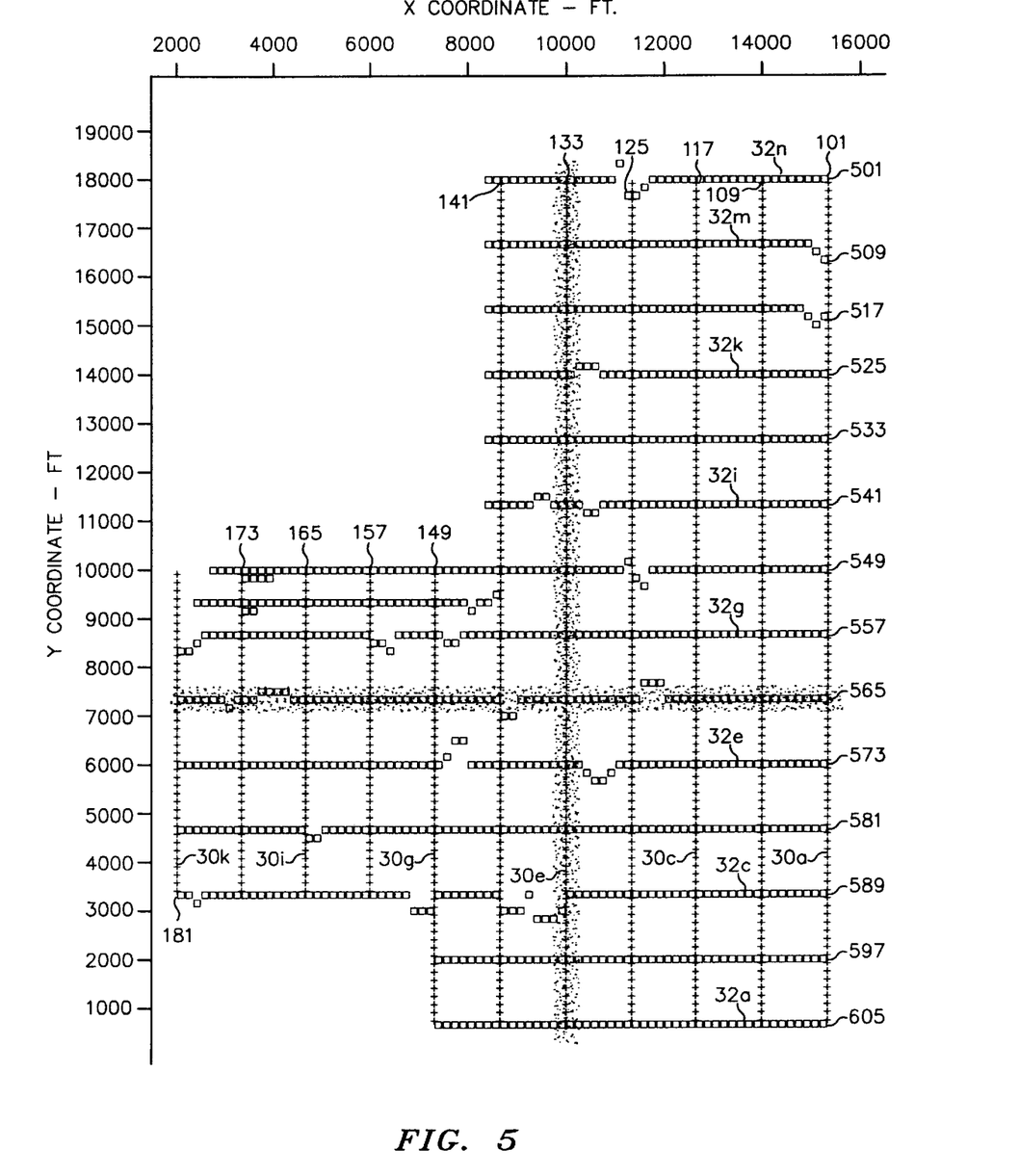
FIG. 5 shows a centrally located hybrid sort center for the area of FIG. 4
Figure 6:
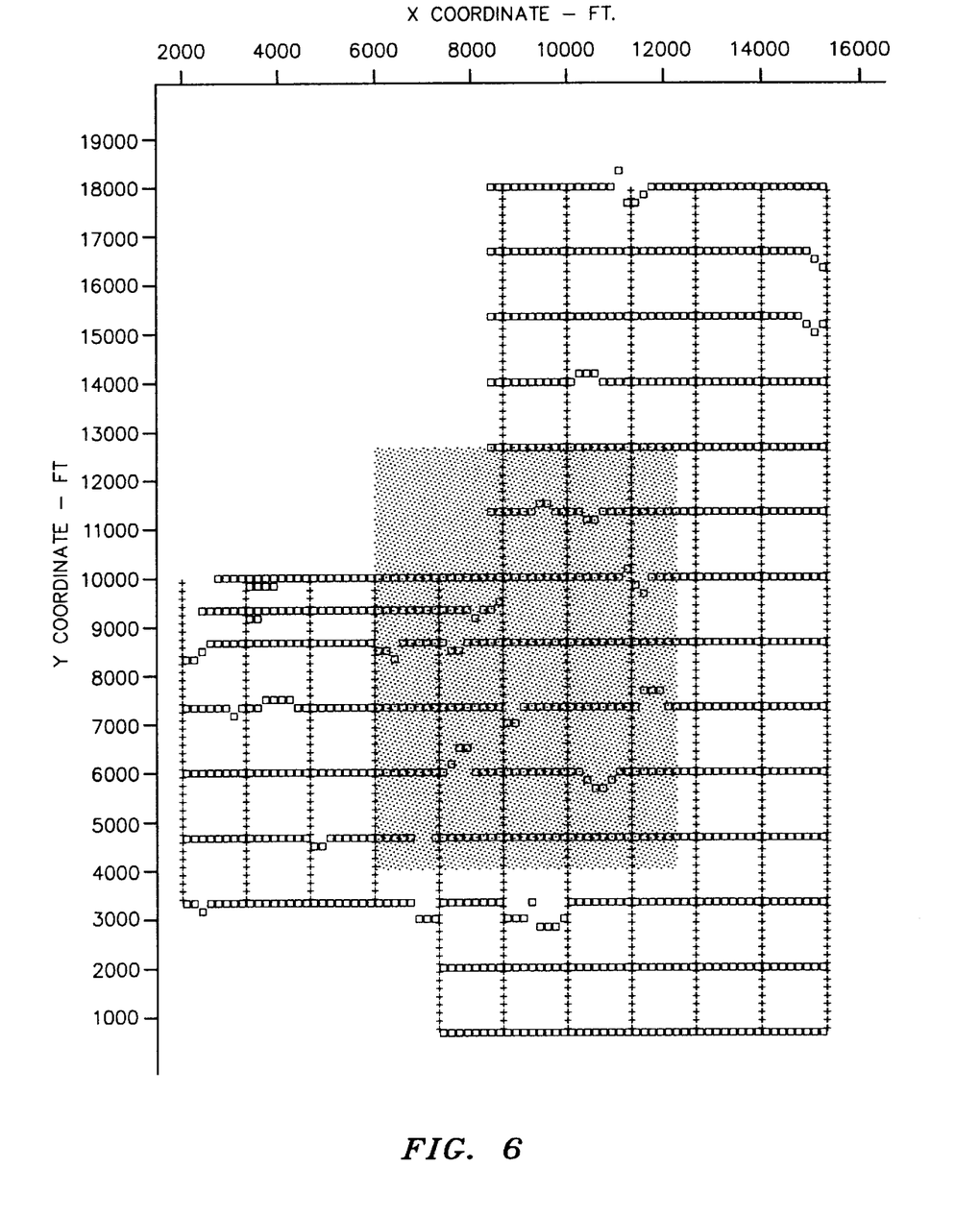
FIG. 6 shows single fold midpoint coverage of a hybrid sort gathered from the sort center of FIG. 5.
Figure 7:
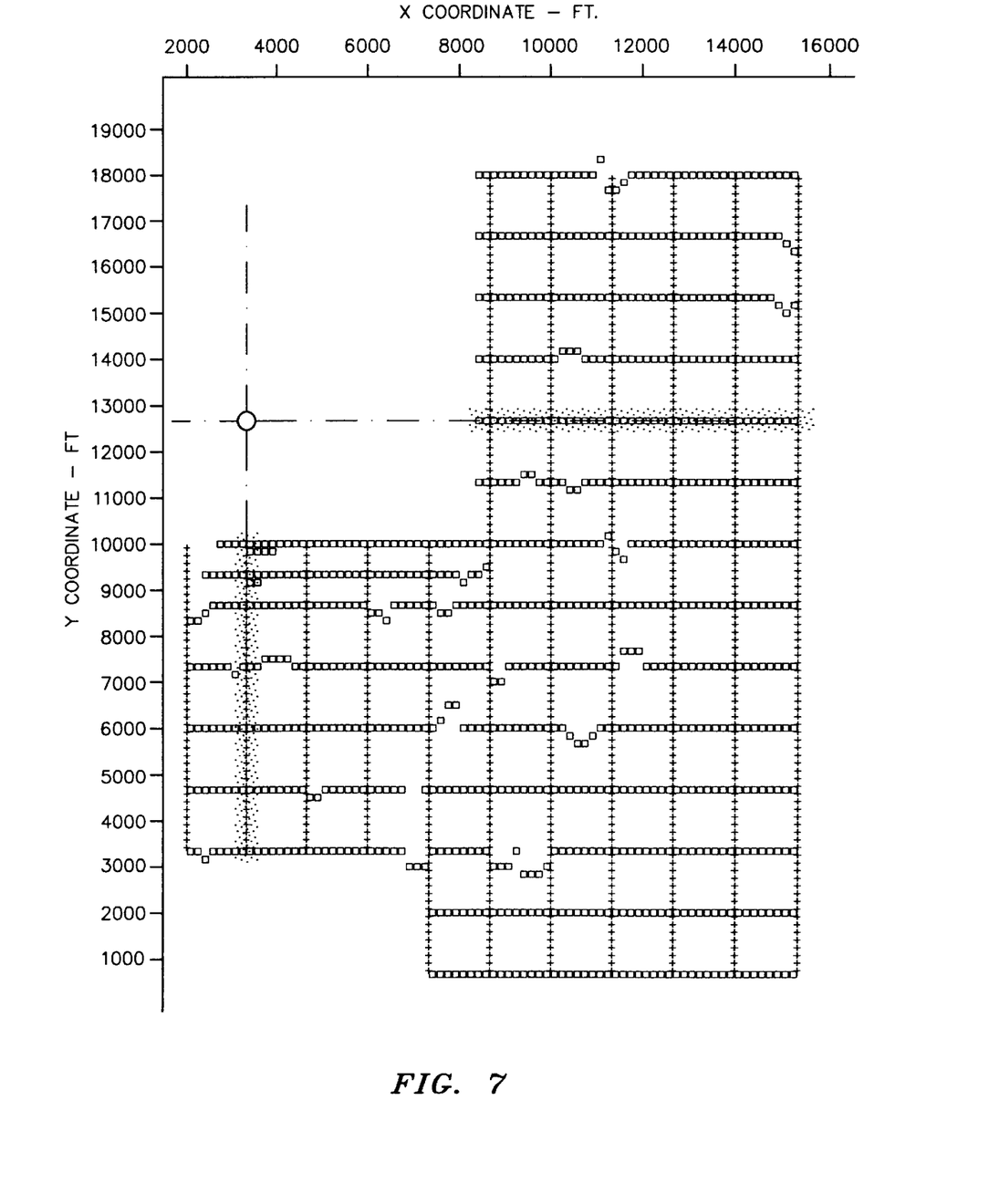
FIG. 7 shown an extrapolated hybrid sort center for the area covered in FIG. 4.

Two data volumes were processed from the Valverde basin 3-D seismic survey. The first data volume was processed using conventional gathering techniques with conventional processing including DMO and post stack migration. The second data volume was sorted into a series of hybrid gathers using intersections of the shot/receiver lines as sort center. The hybrid gathers were then subjected to prestack filtering and imaging processes, and finally reassembled into a single volume. To initiate the hybrid gather process of the orthogonal shot/receiver geometry, a dimension that insures uniform offsets and full coverage from a series hybrid gathers was selected. For the survey area shown in FIG. 4, a frame of 128 stations along the source line and 128 stations along the receiver line was selected for inclusion in the hybrid gather for this survey. The traces to be included in the hybrid gathers were selected as follows: each source line and receiver line intersection, real or extrapolated (as shown in FIG. 7) is a sort center. Then at each sort center the traces generated from shots on the selected source line that are within 64 stations, (i.e. ½ of 128) of the sort center, and which are directed into geophone receivers on the selected receiver line that are within 64 stations of the sort center, make up one hybrid gather. For example, a sort center at the intersection of source line 565 and receive line 133, is illustrated in FIG. 5, where the line numbers and station numbers are shown at the edge of the source/receiver layout. From this sort center a hybrid gather would include traces from shots on source line 565 stations 101 to 181, directed into geophone receiver stations 501 to 605 on receiver line 133, where the shot line and receiver line are highlighted in FIG. 5. FIG. 6 illustrates the single fold coverage area for the sort center illustrated in FIG. 5. FIG. 7 illustrates an extrapolated sort center which results from the irregularity of the actual survey area.

Figure 8A:
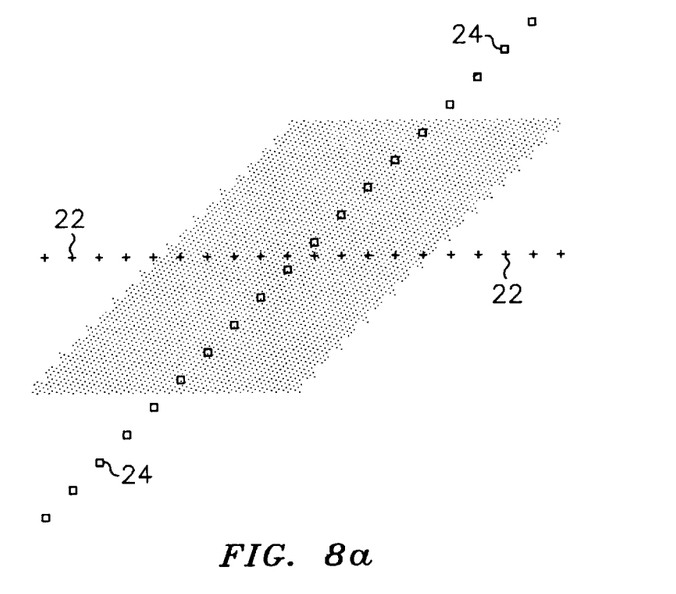
FIG. 8(a) shows single fold hybrid midpoint coverage for an angled seismic source/receiver layout.
Figure 8B:
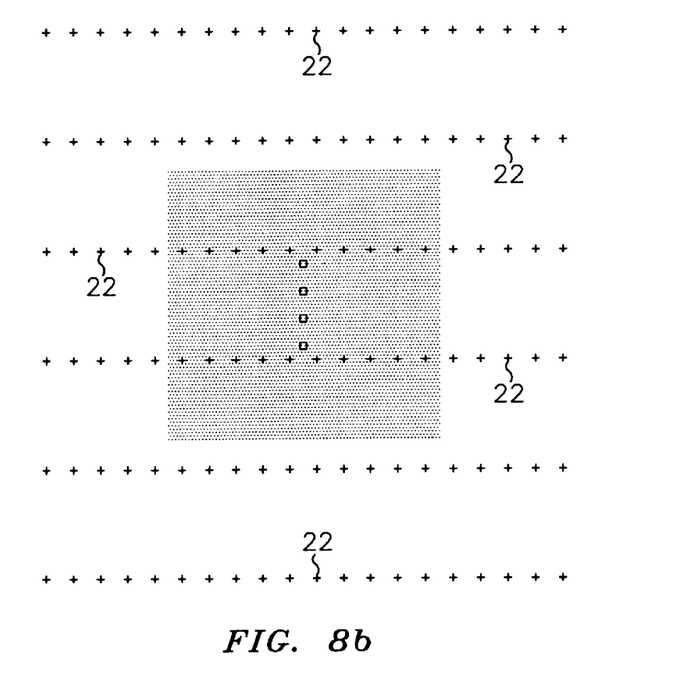
FIG. 8(b) shows single fold hybid midpoint coverage for a brick arrangement of seismic source/receivers.

FIGS. 8(a) and 8(b) illustrate shot/receiver layouts, which are known in the art, and also show, as a shaded area, the single fold coverage that would be obtained in applying the hybrid sort technique of the present invention to the illustrated shot/receiver layouts. The layout illustrated in FIG. 8(a) is known as an angled layout, and the layout illustrated in FIG. 8(b) is know as a brick layout.

Figure 9A:
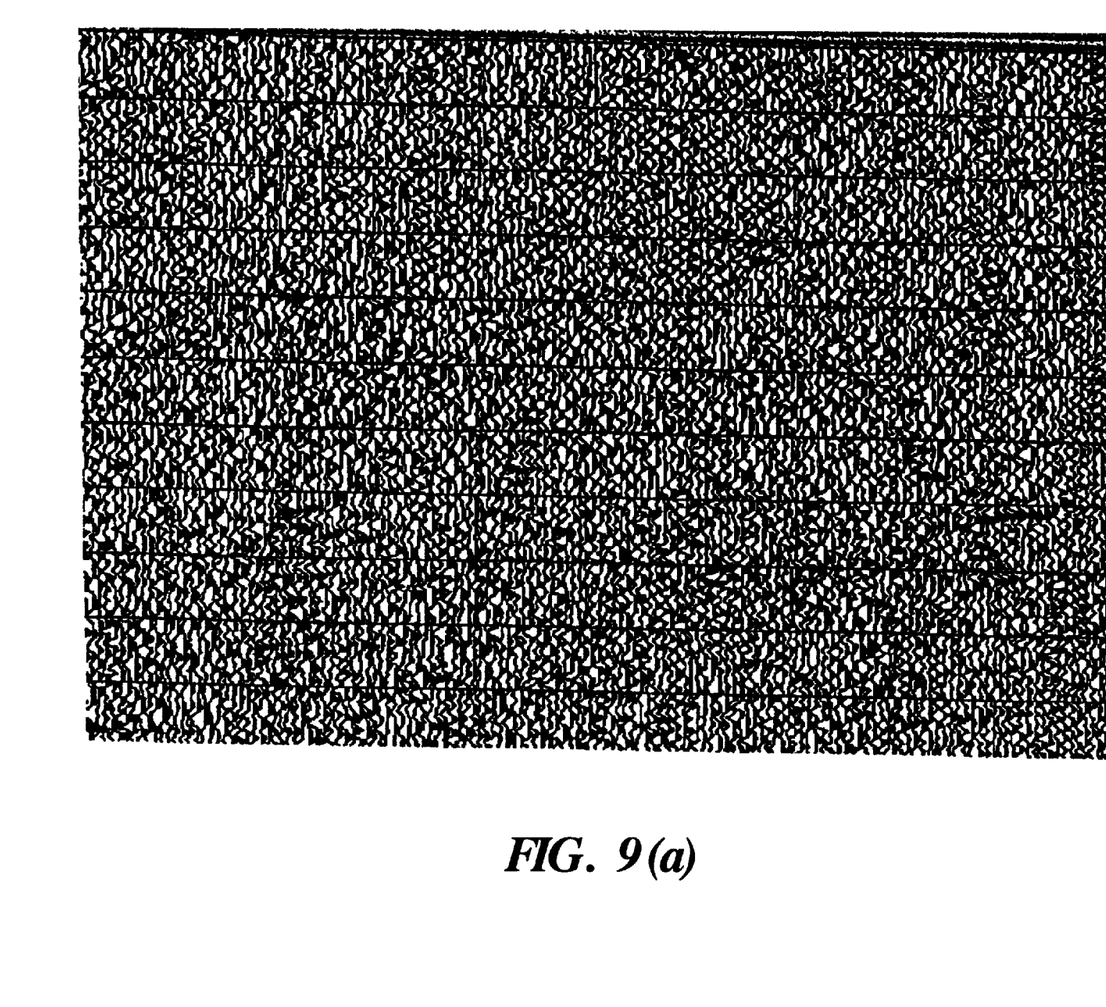
FIG. 9(a) is a computer generated display showing a seismic section on a particular line resulting from an unfiltered stack of hybrid gather.
Figure 9B:
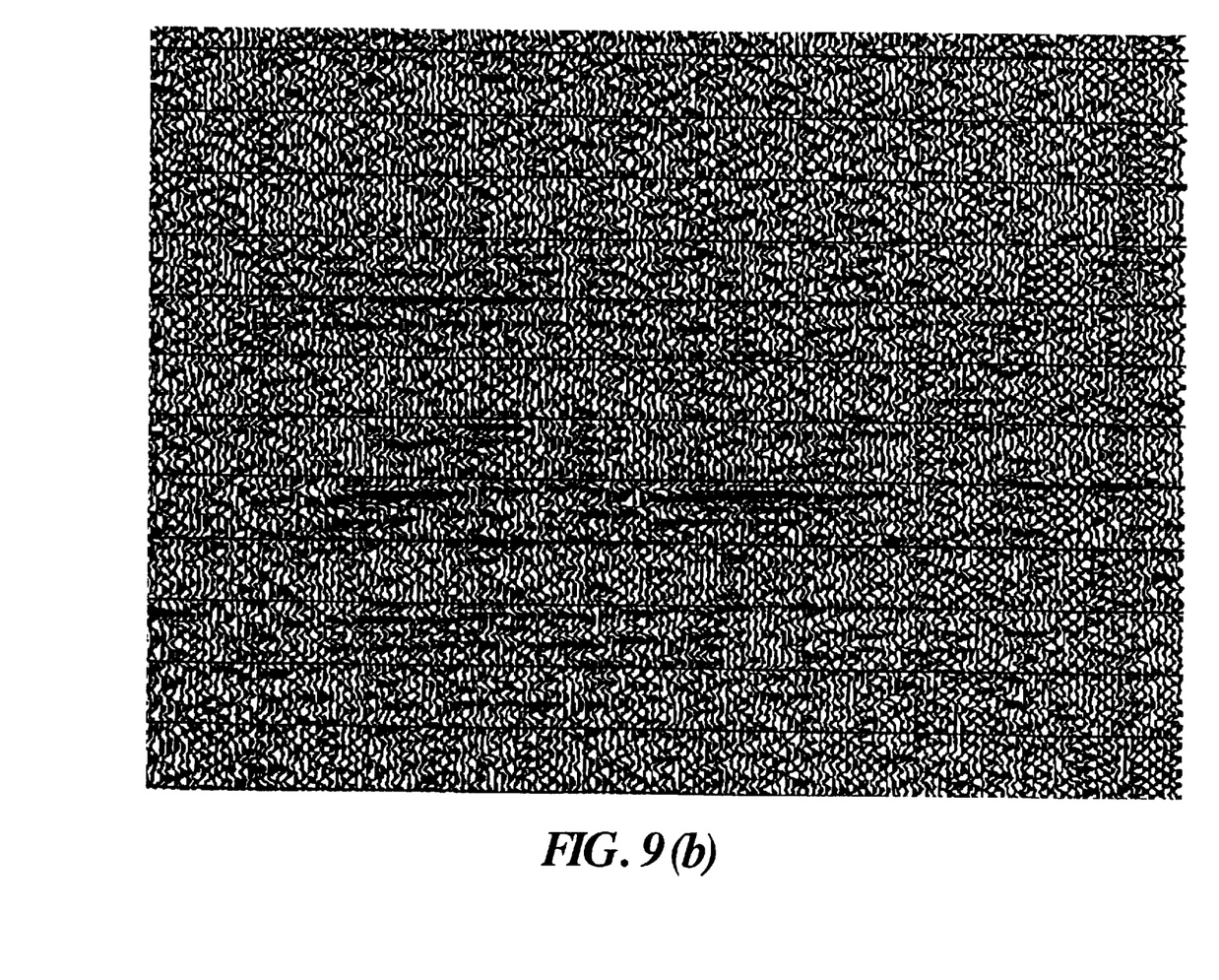
FIG. 9(b) is a computer generated display showing the seismic section of FIG. 9(a) with prestack application of F-K velocity filtering.

By way of illustration of results of this invention, FIGS. 9(a)–(b) show imaging of hybrid gathers, which provide useful information without requiring processing of a full data set. In FIG. 9(a) a two-dimensional slice along a particular source line from the Valverde basin survey is illustrated which resulted from a unique data set obtained in a hybrid gather. The illustrated gather has in FIG. 9(b) been corrected for normal moveout and has been filtered to improve signal to noise ratio using velocity filters without introducing ambiguities from aliased spatial samples. FIG. 9(b) is similar to FIG. 9(a) showing the same image along a receiver line from the same hybrid gather, which was centered at the intersection of receiver line 133 and source line 565 illustrated in FIG. 5.

Three-dimensional data volumes are not typically recorded with "true" spatially unaliased source/receiver layout geometry due to unavailability of recorder systems having sufficient capacity, and/or the excessively high cost encountered in providing sufficient equipment. Accordingly, an alternate method that includes the advantage of the reduced spatial sample increments heretofor realized only in "true" source receiver layouts, and that can be used in land or marine environments, is provided by the present invention. The invention as described and illustrated herein is an effective method of seismic exploration, however, those skilled in the art will recognize that many modifications and variations of the present invention are possible in light of the above teachings without departing from the invention. Accordingly, it should be clearly understood that the present invention is not intended to be limited by the particular features described and illustrated in the drawings, but the concept of the present invention is to be measured by the scope of the appended claims.

That which is claimed is:

1. A method of performing a hybrid gather of seismic traces, wherein said hybrid gather is collected from a section of a seismic survey area, and wherein said hybrid gather includes source/receiver spatial resolution characteristics of a true three-dimensional gather, said method comprising:
   (a) disposing a plurality of seismic sources lines in parallel arrangement over an area to be surveyed, wherein each of said source lines includes a plurality of shotpoints spaced apart by a distance designated as $d_1$ that provides a desired resolution of subsurface features along said source lines;
   (b) disposing a plurality of seismic receivers lines in parallel arrangement, wherein each of said receiver lines includes a plurality of geophone receivers spaced apart by said distance $d_1$ and further wherein said receiver lines intersect said source lines, thereby forming a plurality of intersections of said source lines and said receiver lines;
   (c) wherein said source lines and said receiver lines are spaced apart by at least twice said distance $d_1$;
   (d) defining a sort center as a selected one of said plurality of intersections, said sort center having associated therewith one of said source lines and one of said receiver lines thus designated respectively as a defined source line and a defined receiver line;
   (e) selecting a desired number which indicates the number of shotpoints in said defined source line and number of geophone receivers in said defined receiver line to be included in said hybrid gather corresponding to said sort center, wherein said desired number is selected to maintain a uniform maximum source/receiver offset for said hybrid gathers performed at each of said plurality of intersections:
   (f) sequentially generating seismic signals at each of the selected number of said shotpoints in said defined source line;

(g) gathering said seismic signals generated at each of the selected number of said geophone receivers in said defined receiver line from each of the selected number of shotpoint in said defined source line to produce said hybrid gather; and (h) relocating said sort center to each of said plurality of intersections and repeating steps (d) through (g) at each of said plurality of intersections; thereby obtaining a plurality of said hybrid gathers equal to the number of said intersections.

2. A method in accordance with claim 1, additionally comprising the step of filtering at least one of said hybrid gathers using velocity filtering techniques.

3. A method in accordance with claims 1, wherein said plurality of intersections of said source lines and said receiver lines comprise orthogonal intersections of said source lines and said receiver lines.

4. A method in accordance with claim 1, wherein said plurality of intersections of said source lines and said receiver lines comprise angled intersections of said source lines and said receiver lines.

5. A method in accordance with claim 1, wherein said plurality of intersections of said source lines and said receiver lines form a brick layout pattern.

6. A method in accordance with claim 1, wherein said seismic survey area covers a rectangular area and a primary sort center is located in the center of said survey area.

7. A method in accordance with claim 1, wherein said seismic survey covers an irregular area and said primary sort center is located at the intersection of a source line and a receiver line having the maximum number of stations.

8. A method in accordance with claim 7, wherein a said sort center is extrapolated into an area by inferences based on parallelism between known intersection of said source lines and receiver lines.

* * * * *